Feb. 17, 1948.  F. E. CREVER  2,436,203

ELECTRIC MOTOR CONTROL SYSTEM

Filed May 27, 1946  2 Sheets-Sheet 1

Inventor:
Frederick E. Crever,
by Claude H. Nott.
His Attorney.

Inventor:
Frederick E. Crever,
by Claude A. Mott
His Attorney.

Patented Feb. 17, 1948

2,436,203

UNITED STATES PATENT OFFICE 2,436,203

ELECTRIC MOTOR CONTROL SYSTEM

Frederick E. Crever, Scotia, N. Y., assignor to General Electric Company, a corporation of New York Application May 27, 1946, Serial No. 672,461

7 Claims. (Cl. 318—30)

This invention relates to control systems, more particularly to systems for controlling the operations of electric motors, and it has for an object the provision of a simple, reliable, and improved control system of this character.

Still more specifically the invention relates to systems for controlling a motor to operate in predetermined speed and positional relationships with respect to another motor or with respect to metal being rolled in a mill.

In carrying the invention into effect in one form thereof, a first Selsyn is driven by a suitable driving means and a second Selsyn is driven by a motor which it is desired to operate in predetermined speed and positional relationships with respect to the driving means for the first Selsyn. Each of the Selsyns has a polyphase primary winding and a polyphase secondary winding. The primaries are supplied from a suitable polyphase source. Means are provided for producing a voltage of which the magnitude is proportional to the resultant of the voltages of two phases of the Selsyns which are angularly displaced when the Selsyns are in phase. Means are also provided for producing a similar voltage from two other phases of the Selsyns which are angularly displaced when the Selsyns are in phase. These two voltages vary oppositely, i. e., one increases and the other decreases as the relative phase displacement of the two Selsyns varies. Means responsive to the difference of these two voltages is provided for varying the speed of the motor to cause the motor to drive the second Selsyn in predetermined phase relationship with respect to said first Selsyn.

In illustrating the invention in one form thereof it is shown as embodied in a system for controlling the operation of a flying shear. An object of the invention is to control the shear in such a manner as to synchronize the angular position of the shear blades with the end of the length of steel which is being advanced toward the shear so that the cut will be made at the proper point.

Figure 1:
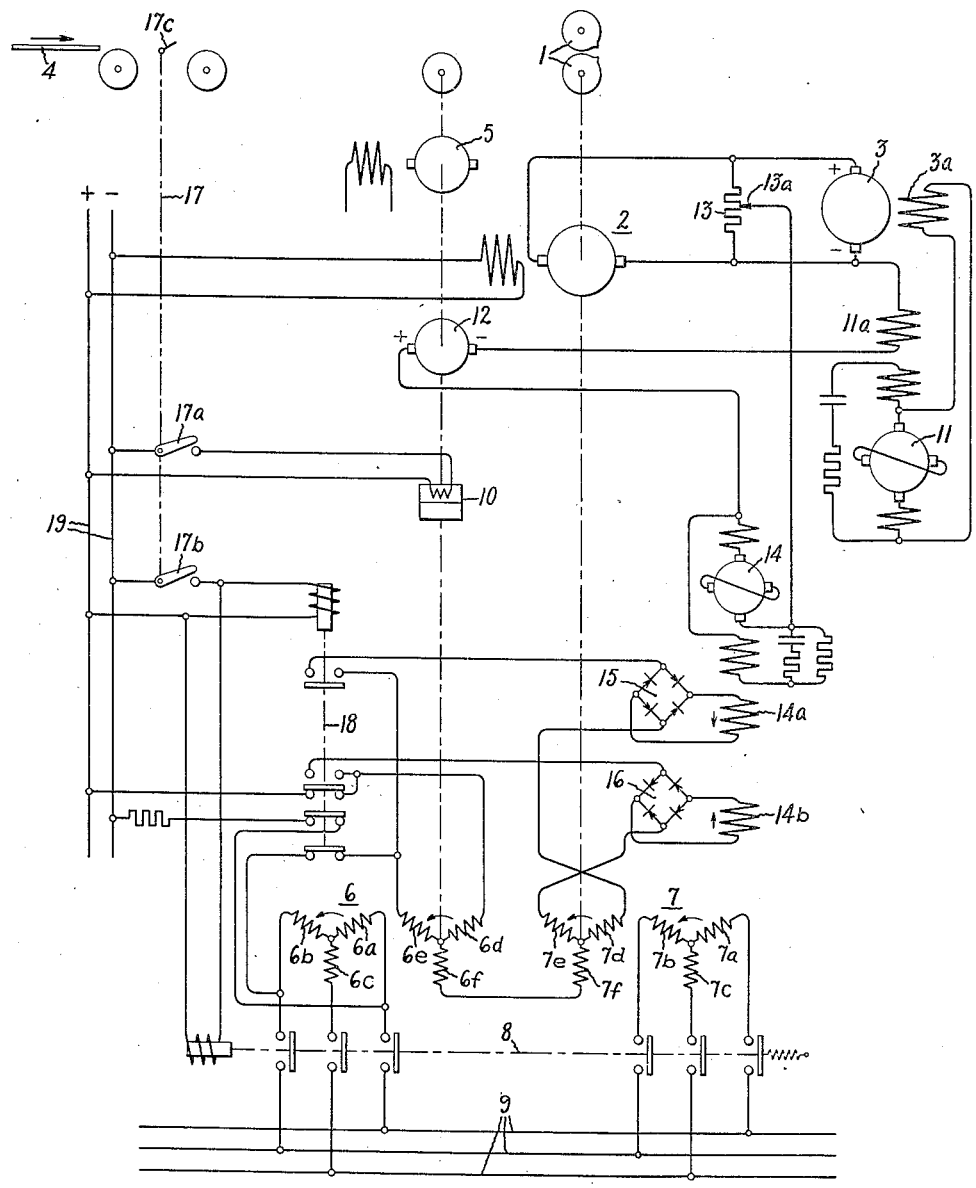
Figure 2:
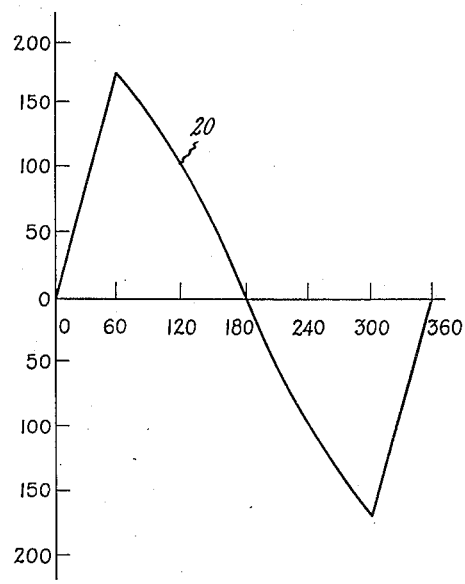

For a better and more complete understanding of the invention, reference should now be had to the following specification and to the accompanying drawing of which Fig. 1 is a simple, diagrammatical sketch of an embodiment of the invention, and Fig. 2 is a characteristic curve which facilitates an understanding of the invention.

Referring now to the drawing, a flying shear having blades 1 is driven by an electric motor 2. Preferably, the motor 2 is of the direct current type. It is supplied from a suitable source such as the adjustable voltage generator 3 which is driven at a speed that is preferably substantially constant, by suitable means, such as an induction motor (not shown). A length of steel 4 is passed through the successive stands of a roughing mill toward the shear. Only the fifth, sixth, and eighth stands of the roughing mill are illustrated in the drawing. They are driven at a suitable speed by suitable driving means such as electric motors. Only the motor 5 for driving the eighth stand is illustrated.

It is desired that the shear shall crop the end of the piece a predetermined distance from the end. If the cut is made at a longer distance, steel will be wasted, and if made at a shorter distance not all of the useless metal of the ragged end will be removed and an entire length will be wasted.

For the purpose of controlling the motor 2 to drive the shear in correct positional relationship with respect to the end of the length of steel, a pair of Selsyns 6 and 7 are provided. The Selsyn 6 is provided with a primary polyphase winding, having phases 6a, 6b and 6c, and with a polyphase secondary winding having phases 6d, 6e and 6f. Similarly, the Selsyn 7 is provided with a polyphase primary winding, having phases 7a, 7b and 7c, and a polyphase secondary winding having phases 7d, 7e and 7f.

The primary windings of the Selsyns are illustrated as mounted on the stator members and the secondary windings as mounted on the rotor members. However, the reverse arrangement may be employed if desired.

An electromagnetic contactor 8 is provided for the purpose of connecting the primary windings of both Selsyns to a polyphase source of alternating voltage which is represented by the three conductors 9. The rotor member of Selsyn 6 is mechanically coupled to the shaft of the motor 5 by means of an electromagnetic clutch 10. The rotor member of Selsyn 7 is directly connected to the shaft of the motor 2.

As shown, the adjustable voltage generator is provided with a field winding 3a which is excited from a suitable exciter dynamo-electric machine 11. This machine may be of any suitable type, such, for example, as the compensated armature reaction excited type described and claimed in Patent 2,227,992, Edwards and Alexanderson, which patent is assigned to the assignee of this application.

The voltage of the machine 11 and consequently the excitation of the supply generator 3 and the speed of the motor 2 are controlled by means of a control field winding 11a. This field winding is excited by the difference of two voltages which are proportional to the speeds of the motors 2 and 5. The voltage proportional to the speed of the motor 5 is produced by means of a tachometer generator 12 which is driven by the motor 5. The voltage which is proportional to the speed of the motor 2 is derived from a potentiometer 13 which is connected across the armature terminals of motor 2.

For the purpose of further controlling the speed of the motor 2 in accordance with the relative phase of the Selsyns 6 and 7, an exciter dynamo-electric machine 14 is provided which is excited in accordance with the difference of two voltages which are derived from the Selsyns. Although the exciter 14 may be of any suitable type, it is preferably an armature reaction excited machine such as the machine 11. Its armature is connected in circuit with the field winding 11a of machine 11. This circuit is traced from the negative terminal of tachometer generator 12, through field winding 11a to the negative terminal of the potentiometer 13, slider 13a, armature of dynamo-electric machine 14 to the positive terminal of the tachometer generator 12. Both exciters 11 and 14 are driven at a constant speed by suitable means such as an induction motor (not shown).

The machine 14 is provided with two control field windings 14a and 14b which act differentially or in opposition to each other to produce a net or resultant control effect which is responsive to a difference in phase of the Selsyns when they are out of phase but are rotating at the same speed.

The control field winding 14a is energized in accordance with the magnitude of the vector resultant of the voltages of two of the phases of the Selsyns 6 and 7 which are out of phase when the Selsyns are in phase. For example, this field winding is energized in accordance with the magnitude of the vector resultant of the voltages of the phases 6e and 7d. The voltage of phase 6e lags the voltage of the phase 7d when the Selsyns are in phase. Similarly, the control field winding 14b is energized in accordance with the magnitude of the resultant of the voltages of the phases 6d and 7e. The voltage of phase 6d leads the voltage of phase 7e when the Selsyns are in phase.

As shown, the control field winding 14a is connected in series with the phases 6e and 7d through a full wave rectifier 15, and the phases 6f and 7f which are connected together. Similarly, the control field winding 14b is connected in series with the phase windings 6d and 7e through a full wave rectifier 16 and the phases 6f and 7f.

A flag switch 17 is provided between the fifth and sixth stands of the mill and is arranged to close its contacts 17a and 17b when the flag 17c is engaged by length of steel 4.

An electromagnetic contactor 18 which is controlled by the contact 17b of the flag switch is provided for the purpose of interrupting the connections between Selsyn 6 and the rectifiers 15 and 16 when the steel is not in contact with the flag. At this time it also serves to complete the connections between direct current source 19 and the primary phases 6a and 6b and the secondary phases 6d and 6e of the Selsyn 6.

With the foregoing understanding of the elements and their organization, the operation of the system will be readily understood from the following description.

The motor 2 drives the blades 1 of the shear at a speed which corresponds to the speed at which the eighth stand of the mill is driven by the motor 5. When this speed relationship obtains, the difference between the voltage of the tachometer generator and the voltage tapped off at the potentiometer 13 by the slider 13a is just sufficient to energize the field winding 11a to maintain a balanced condition of the system. If the speed of the eighth stand is increased, the voltage of the tachometer generator will increase, thereby to increase the difference between the voltage of the tachometer generator 12 and the voltage at the slider 13a. This increases the excitation of the field winding 11a, thereby increasing the excitation of exciter 11 which results in increasing the voltage of the generator 3 and the speed of the motor 2 until the balanced condition is restored.

Similarly, if the speed of the eighth stand is decreased, the difference of the voltage at the slider 13a and the voltage of the tachometer generator is decreased, thereby decreasing the excitation of the exciter 11 and the speed of the motor 2 until the balanced condition of the system is restored.

With the contacts 17a open, the magnetic clutch 10 is deenergized and open, thereby interrupting the driving connection between the motor 5 and the rotor of Selsyn 6. Also, with the contacts 17b open, the contactors 8 and 18 are deenergized and open. In its open position, contactor 8 disconnects the primary windings of the Selsyns 6 and 7 from the alternating voltage source 9. The normally closed contacts of contactor 18 connect the phases 6a, 6b, 6d and 6e in series to the D.-C. source 19. Consequently the rotor member of Selsyn 6 is rotated to and locked in a predetermined initial position.

When the length of steel 4 strikes the flag, the switch 17 closes its contacts 17a and 17b. In closing, contacts 17b complete energizing circuits for the contactors 8 and 18. In response to energization the contactor 18 opens its normally closed contacts to interrupt the supply of direct current to phases 6a, 6b, 6d and 6e and closes its normally open contacts, to complete the connections between the phases 6d and 6e and the rectifiers 15 and 16. Simultaneously, the contacts 17a in closing energize the electromagnetic clutch 10, causing it to complete the driving connection between the motor 5 and the rotor of Selsyn 6.

Assume that the phase rotation of the Selsyns is counter-clockwise. Assume further that when the clutch is engaged the shear blades have the correct position relative to the position of the end of the length of steel 4. Consequently the Selsyns 6 and 7 are in synchronism and in phase. Under these conditions, the control field windings 14a and 14b will be equally and oppositely energized and thus will produce no controlling effect.

The polarity of the control field winding 14a is such as to tend to increase the excitation of the field winding 11a and thus to increase the speed of the motor 2. The polarity of the field winding 14b has the opposite polarity and it therefore tends to decrease the speed of the motor. It is seen that the machine 14 is a buck-boost exciter, i. e. it bucks or boosts the excitation of the field winding 11, depending on which of its two field windings is the more strongly energized.

Assume now that the position of the blades 1 begins to lag the correct position with respect to the end of the length of steel 4. This causes the Selsyn 7 to lag the Selsyn 6, thereby increasing the resultant of the voltages of the phases 6e and 7d and decreasing the resultant of the voltages of the phases 6d and 7e. Consequently the energization of the field winding 14a is increased and that of the field winding 14b is decreased. This results in increasing the net excitation of the exciter 14 in a direction to increase the excitation of field winding 11 and thus to increase the speed of the motor 2. As a result, the phase of the Selsyn 7 is advanced and likewise the blades 1 of the shear are restored to their correct position relative to the end of the length of steel.

Similarly, if the position of the blades becomes advanced with respect to the end of the steel strip, the resultant of the voltages of phases 6e and 7d decreases and the resultant of the voltages of phases 6d and 7e increases. This decreases the excitation of the field winding 14a and increases the excitation of the field winding 14b, thereby increasing the net excitation of the exciter 14 in a direction to buck the excitation of the winding 11a. This results in decreasing the speed of the motor 2 thereby restoring the Selsyns to synchronism and restoring the correct position of the shear blades relative to the position of the end of the length of steel.

If the shear blades are not in the correct position relative to the end of the steel when the clutch is engaged, the Selsyns will not be in synchronism. Consequently the net excitation of the exciter 14 will have a polarity to increase or decrease the speed of the motor 2 as required to bring the Selsyns into synchronism and the blades into the correct position relative to the end of the length of steel.

It is possible for the field windings 14a and 14b to have equal energizations when the Selsyns are operating exactly 180 degrees out of phase. However, this is an unstable operating condition because the slightest departure of the Selsyns from this 180 degree position causes a further departure and the shear will always synchronize about the zero phase displacement condition which is the condition referred to as in phase.

By choosing the opposite polarity of the dynamo-electric machine 14, the out of phase or 180 degree point can be made the stable point and the zero degree point, the unstable point.

This is illustrated in Fig. 2 by the characteristic curve 20 the ordinates of which represent the difference between the two rectified voltages which are supplied to the control field windings 14a and 14b of the amplidyne 14 and the abscissas of which represent the phase angle by which the secondary voltage of the Selsyn 6 leads the secondary voltage of the Selsyn 7. If the secondary voltage of Selsyn 7 leads that of Selsyn 6 by an angle between 180 and 360 degrees the amplidyne 14 is excited with its voltage in a direction to subtract from the voltage of the tachometer 12 which causes the shear to slow down momentarily until the 180 degree position is reached at which the voltage of the dynamo-electric machine is such that its voltage adds to the voltage of the tachometer generator which causes the shear to speed up until the 180 degree point is reached. If the voltages are in phase there is no excitation of the dynamo-electric machine 14, but this point is unstable because a slight departure from this point causes a further departure and hence the shear will always synchronize at the 180 degree point.

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. A control system comprising a driving means, a first Selsyn having a rotor member connected to said driving means and a stator member, a polyphase primary winding on one of said members and a secondary polyphase winding on the other of said members, an electric motor, a second Selsyn having a rotor member connected to said motor and a stator member, a polyphase primary winding on one member of said second Selsyn and a polyphase secondary winding on the other member, and means responsive to the difference of two voltages for varying the speed of said motor to cause said motor to drive the rotor of said second Selsyn in predetermined phase relationship with the rotor of said first Selsyn, said voltages changing oppositely in magnitude with a change in relative phase of said Selsyns and each being the vector resultant of the voltages of two different phases of said secondary windings.

2. A control system comprising a driving means, a first Selsyn having a rotor member connected to said driving means and a stator member, a polyphase primary winding on one of said members and a secondary polyphase winding on the other of said members, an electric motor, a second Selsyn having a rotor member connected to said motor and a stator member, a polyphase primary winding on one member of said second Selsyn and a polyphase secondary winding on the other member, means responsive to the difference of two voltages for varying the speed of said motor to cause said motor to drive the rotor of said second Selsyn in predetermined phase relationship with the rotor of said first Selsyn, said voltages changing oppositely in magnitude with a change in relative phase of said Selsyns and each being the vector resultant of the voltages of two different phases of said secondary windings, means for producing a control voltage corresponding to the speed of said driving means, means for producing a control voltage corresponding to the speed of said motor, and means responsive to the difference of said control voltages for varying the speed of said motor to drive said second Selsyn in predetermined phase relationship with respect to said first Selsyn.

3. A control system comprising a driving means, a first Selsyn having a rotor member connected to said driving means and a stator member, a polyphase primary winding on one of said members and a secondary polyphase winding on the other of said members, an electric motor, a second Selsyn having a rotor member connected to said motor and a stator member, a polyphase primary winding on one member of said second Selsyn and a polyphase secondary winding on the other member, and a dynamo-electric machine excited in response to the difference of two voltages for varying the speed of said motor to cause said motor to drive said second Selsyn in predetermined phase relationship with said first Selsyn; and voltages changing oppositely in magnitude with respect to each other in response to a change in relative phase of said Selsyns and each being the vector resultant of the voltages of two different phases of said secondary windings.

4. A control system comprising a driving means, a first Selsyn having a rotor member connected to said driving means and a stator member, a polyphase primary winding on one of said members and a secondary polyphase winding on the other of said members, an electric motor, a second Selsyn having a rotor member connected to said motor and a stator member, a polyphase primary winding on one member of said second Selsyn and a polyphase secondary winding on the other member, means for producing a control voltage which is proportional in magnitude to the resultant of the voltages of two phases of said Selsyns which are angularly displaced when the Selsyns are in phase, means for producing a second control voltage which is proportional in magnitude to the resultant of the voltages of two other phases of said Selsyns which are angularly displaced when the Selsyns are in phase, and a dynamo-electric machine excited in response to the difference of said control voltages for varying the speed of said motor to cause said motor to drive said second Selsyn in predetermined phase relationship with said first Selsyn.

5. A control system comprising a driving means, a first Selsyn having a rotor member connected to said driving means and a stator member, a polyphase primary winding on one of said members and a secondary polyphase winding on the other of said members, an electric motor, a second Selsyn having a rotor member connected to said motor and a stator member, a polyphase primary winding on one member of said second Selsyn and a polyphase secondary winding on the other member, means for producing a voltage proportional to the speed of said driving means, means for producing a voltage proportional to the speed of said motor, a first dynamo-electric machine excited in response to the difference of said voltages for varying the speed of said motor to equalize the speeds of said Selsyns, means for producing a control voltage which is proportional in magnitude to the resultant of the voltages of two phases of said Selsyns which are angularly displaced when said Selsyns are in phase, means for producing a second control voltage which is proportional in magnitude to the resultant of the voltages of two other phases of said Selsyns which are angularly displaced when said Selsyns are in phase, and a second dynamo-electric machine excited in response to the difference of said control voltages for varying the speed of said motor to cause said motor to drive said second Selsyn in predetermined phase relationship with said first Selsyn.

6. A control system comprising a driving means, a first Selsyn having a rotor member connected to said driving means and a stator member, a polyphase primary winding on one of said members and a secondary polyphase winding on the other of said members, an electric motor, a second Selsyn having a rotor member connected to said motor and a stator member, a polyphase primary winding on one member of said second Selsyn and a polyphase secondary winding on the other member, a tachometer generator driven by said driving means for producing a voltage proportional to the speed thereof, a potentiometer connected across the armature of said motor for producing a voltage proportional to the speed of said motor, a first dynamo-electric machine having a field winding connected in circuit with said generator and a portion of said potentiometer for varying the speed of said motor to equalize the speeds of said Selsyns, means for producing a control voltage proportional in magnitude to the resultant of the voltages of two phases of said Selsyns which are angularly displaced when said Selsyns are in phase, means for producing a second control voltage which is proportional in magnitude to the resultant of the voltages of two other phases of said Selsyns which are angularly displaced when said Selsyns are in phase, and a second dynamo-electric machine having a field winding excited by the difference of said control voltages and having its armature connected in circuit with said tachometer generator and said potentiometer for modifying the excitation of said first dynamo-electric machine to vary the speed of said motor to cause said motor to drive said second Selsyn in predetermined phase relationship with said first Selsyn.

7. A control system comprising a driving means, an electric motor, a first Selsyn having a stator member and a rotor member, a polyphase primary winding on one of said members, a polyphase secondary winding on the other of said members, means for completing and interrupting a driving connection from said driving means to said rotor member, means responsive to the interruption of said connection for supplying direct current to a portion of each of said windings to move said rotor to a predetermined initial position, a second Selsyn having a stator member and a rotor member connected to said motor, a polyphase primary winding on one of the members of said second Selsyn and a polyphase secondary winding on the other of said members, means for connecting the primary winding of said second Selsyn to a source of alternating voltage, switching means for interrupting said direct current, connecting the primary winding of said first Selsyn to said alternating voltage source and completing said driving connections, means for producing a first voltage proportional in magnitude to the resultant of the voltages of two phases of said Selsyns which are angularly displaced when said Selsyns are in phase, means for producing a second voltage proportional in magnitude to the resultant of the voltages of two other phases of said Selsyns which are angularly displaced when said Selsyns are in phase, and means responsive to the difference of said first and second voltages for varying the speed of said motor to cause said motor to drive said second Selsyn in predetermined phase relationship with said first Selsyn.

FREDERICK E. CREVER.